(12) United States Patent
Matsuoka et al.

(10) Patent No.: US 8,134,643 B2
(45) Date of Patent: Mar. 13, 2012

(54) SYNTHESIZED IMAGE DETECTION UNIT

(75) Inventors: Hideki Matsuoka, Kawasaki (JP);
Takashi Hamano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 612 days.

(21) Appl. No.: 12/318,286

(22) Filed: Dec. 23, 2008

(65) Prior Publication Data

US 2009/0167938 A1    Jul. 2, 2009

(30) Foreign Application Priority Data

Dec. 28, 2007   (JP) ................................ 2007-339688

(51) Int. Cl.
    *H04N 7/01* (2006.01)
(52) U.S. Cl. .................... 348/448; 348/441; 348/558
(58) Field of Classification Search .................. 348/441,
    348/458, 459, 446, 448, 452, 451, 558, 584,
    348/598, 239; *H04N 7/01, 11/20*
    See application file for complete search history.

(56) References Cited

U.S. PATENT DOCUMENTS

| 6,340,990 | B1 * | 1/2002 | Wilson ........................ 348/448 |
| 7,724,304 | B2 * | 5/2010 | Wredenhagen et al. ...... 348/452 |
| 2007/0273789 | A1 | 11/2007 | Tokutomi et al. | |

FOREIGN PATENT DOCUMENTS

| JP | 2004-040815 | 2/2004 |
| JP | 2005-045807 | 2/2005 |
| JP | 2005-318611 | 11/2005 |
| JP | 2005-318624 | 11/2005 |
| JP | 2006-126965 | 5/2006 |
| JP | 2006-303910 | 11/2006 |
| JP | 2007-274411 | 10/2007 |

OTHER PUBLICATIONS

JP 2007-274411 was cited in the Office Action mailed Dec. 15, 2009 for Japanese Patent Application 2007-339688 and corresponds to US 2007/0273789 A1.

* cited by examiner

*Primary Examiner* — Sherrie Hsia
(74) *Attorney, Agent, or Firm* — Staas & Halsey LLP

(57) ABSTRACT

A high quality image is achieved by reducing the occurrence of combing noise in a synthesized image having an inserted image of a different frame frequency. A feature amount of a screen produced by an input interlace-scanned video signal is extracted, a film mode on a screen-by-screen basis from the feature amount extracted is detected, the input interlace-scanned video signal to be a synthesized image is decided from a local area in the screen, and the film mode detection is controlled not to output the film mode detection result, based on the decision result.

10 Claims, 8 Drawing Sheets

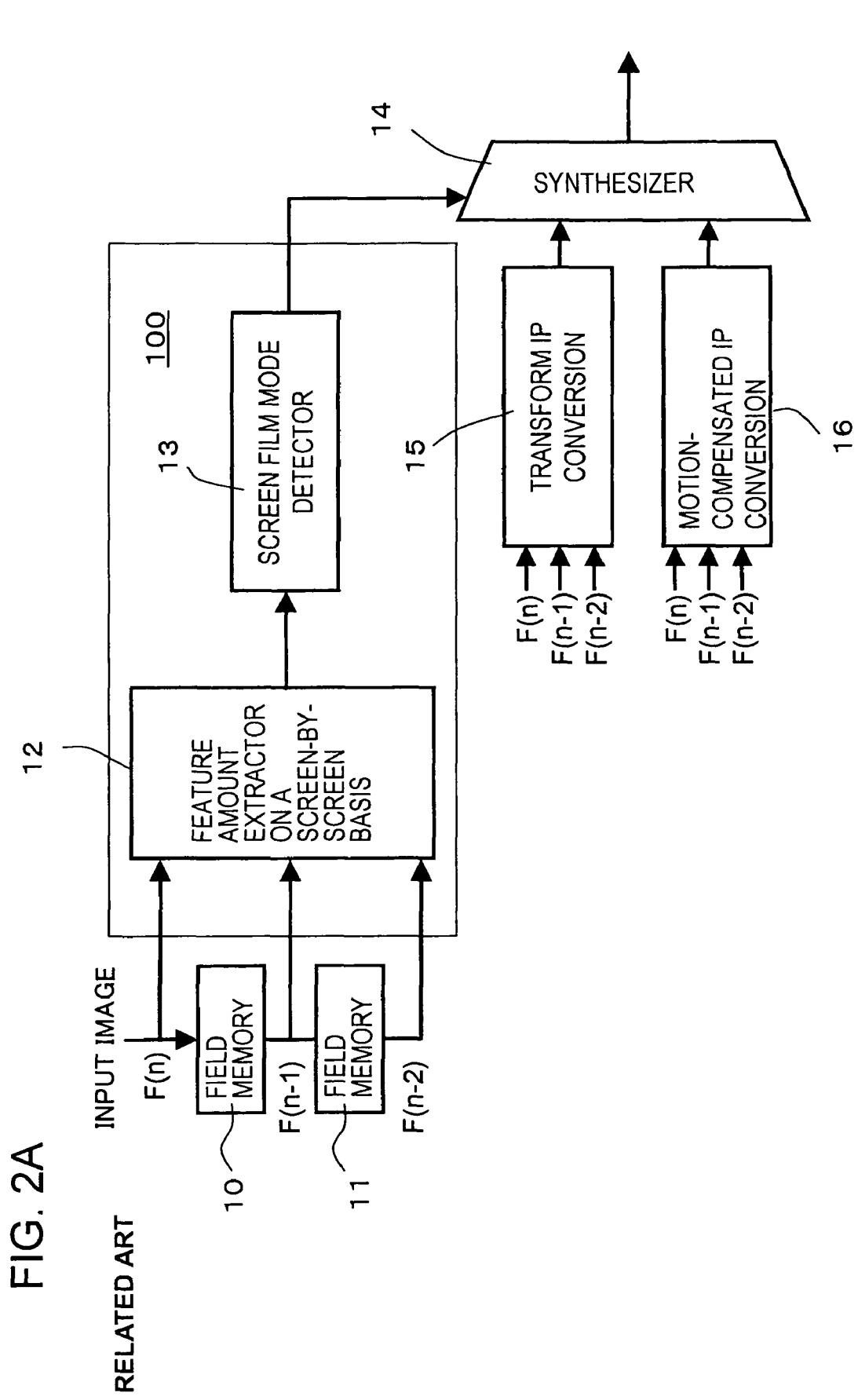

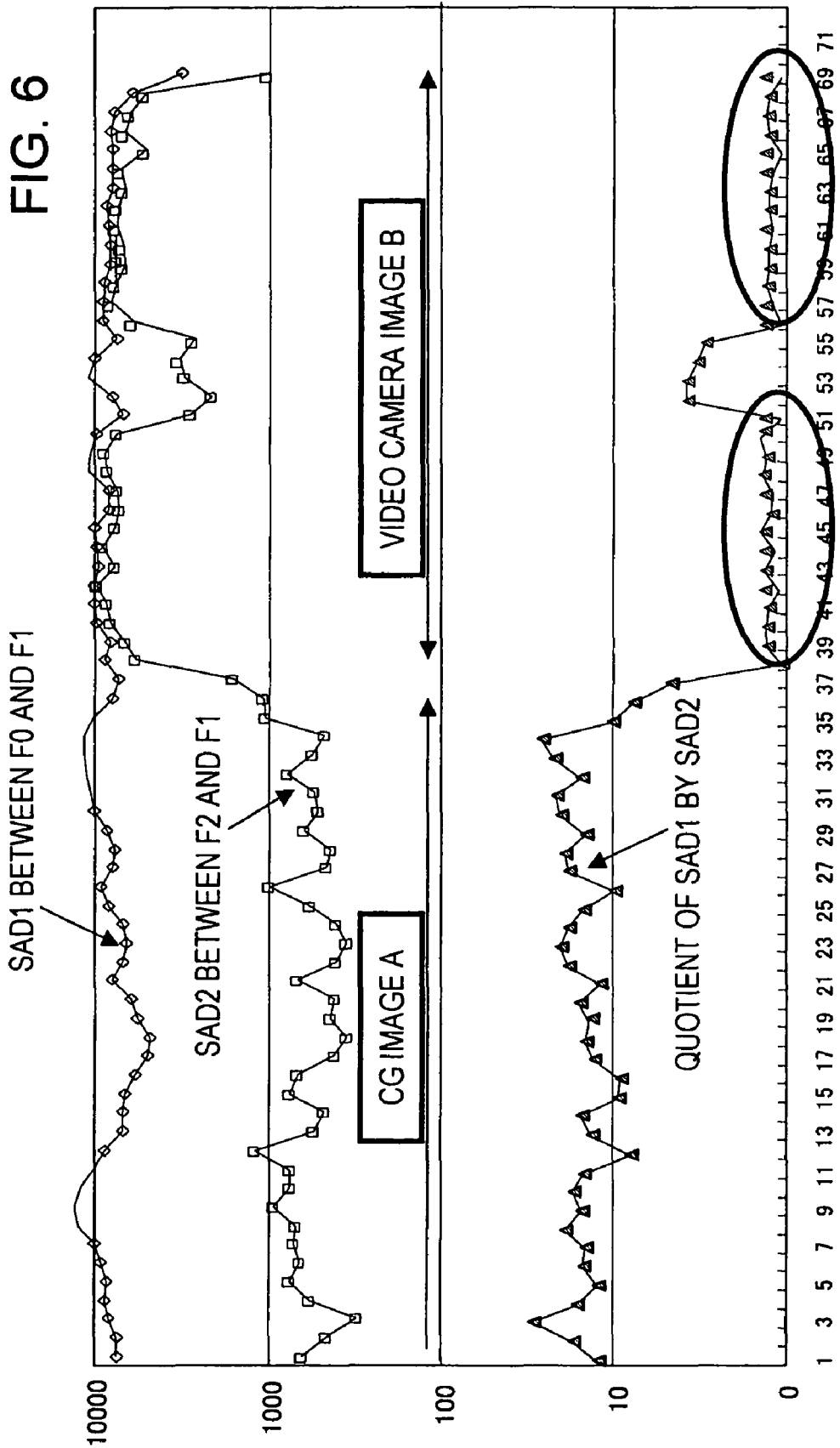

| SAD1 | SAD2 | QUOTIENT |
|---|---|---|
| 19898 | 1622 | 12 |
| 19463 | 1396 | 14 |
| 20271 | 1548 | 13 |
| 19305 | 1189 | 16 |
| 21577 | 1174 | 18 |
| 21064 | 1292 | 16 |
| 19598 | 1195 | 16 |
| 16771 | 1030 | 16 |
| 17720 | 1245 | 14 |
| 19244 | 1490 | 13 |
| 20364 | 1278 | 16 |
| 22196 | 1162 | 19 |
| 23092 | 1217 | 19 |
| 22670 | 1043 | 22 |
| 22898 | 819 | 28 |
| 26179 | 981 | 27 |
| 29269 | 777 | 38 |
| 29622 | 1018 | 29 |
| 29744 | 676 | 44 |
| 30291 | 1144 | 26 |
| 30199 | 1124 | 27 |
| 31201 | 1107 | 28 |
| 32783 | 1282 | 26 |
| 33783 | 1910 | 18 |
| 33841 | 1569 | 22 |
| 31097 | 1853 | 17 |
| 29793 | 1517 | 20 |
| 26853 | 1307 | 21 |
| 27277 | 1604 | 17 |
| 26502 | 1221 | 22 |
| 28288 | 1330 | 21 |
| 28374 | 2141 | 13 |
| 25535 | 1788 | 14 |

| SAD1 | SAD2 | QUOTIENT |
|---|---|---|
| 7478 | 642 | 12 |
| 7406 | 456 | 16 |
| 8155 | 305 | 27 |
| 8606 | 567 | 15 |
| 8529 | 745 | 11 |
| 9212 | 650 | 14 |
| 9901 | 720 | 14 |
| 12491 | 692 | 18 |
| 9864 | 520 | 19 |
| 10682 | 539 | 20 |
| 11158 | 779 | 14 |
| 11353 | 557 | 20 |
| 11411 | 473 | 24 |
| 10197 | 1058 | 10 |
| 7809 | 1073 | 7 |
| 7098 | 1627 | 4 |
| 7946 | 6537 | 1 |
| 9758 | 8029 | 1 |
| 9943 | 8461 | 1 |
| 10121 | 9795 | 1 |
| 9382 | 7535 | 1 |
| 9765 | 8933 | 1 |
| 9974 | 7669 | 1 |
| 8320 | 7285 | 1 |
| 8159 | 7392 | 1 |
| 10809 | 8553 | 1 |
| 10526 | 8715 | 1 |
| 9796 | 7415 | 1 |
| 6890 | 2859 | 2 |
| 7771 | 2173 | 4 |
| 10812 | 3041 | 4 |
| 10028 | 3221 | 3 |
| 7465 | 2687 | 3 |

SYNTHESIZED IMAGE DETECTION UNIT

CROSS-REFERENCE TO RELATED APPLICATIONS

This application is based upon and claims the benefit of priority of the prior Japanese Patent Application No. 2007-339688, filed on Dec. 28, 2007, the entire contents of which are incorporated herein by reference.

FIELD

The present invention relates to a synthesized image detection unit for performing optimal IP (Interlace to Progressive) conversion of an interlace-scanned video signal to successively display on a scanning display unit.

BACKGROUND

Conventionally, when a cathode ray tube is used as a display element, an odd/even interlace scanning method has been used to save the bandwidth and render at high speed.

Meanwhile, in recent years, many types of display elements have been put into use, and a progressive (sequential) scanning method is widely adopted, irrespective of the display device types such as liquid crystal display, plasma display and rear projection.

The progressive (sequential) scanning method is a method to form a screen by one-time scanning without dividing into two rows, like the odd-even interlace scanning method in which each screen is divided into two rows: even rows and odd rows. Basically, outputs to a computer monitor are performed using the progressive scanning method.

Therefore, by the progressive scanning method, in order to display an interlace-scanned video signal according to the odd/even interlace scanning method on the display devices such as liquid crystal display, plasma display and rear projection, it is essential to perform IP (Interlace to Progressive) conversion to convert from the interlace scanning method to the progressive scanning method.

Corresponding thereto, today, a digital television receiver performs display processing of an image by converting from a received interlace-scanned video signal to a progressive video signal through the IP conversion.

In the above IP conversion processing, there is performed the compensation of an interlaced image in which a half of the information is omitted in each field. Therefore, if the compensation processing is simply performed, the number of frames becomes half. A variety of methods have been devised for the above compensation.

Depending on the propriety of such the IP conversion processing and the difference in the method for harmonizing with other image control techniques, different image quality may be produced.

In the meantime, with the progress of an image edition technique, a variety of synthesized images have come to broadcast. For example, in one screen of a broadcast image conforming to the NTSC system (or the PAL system), there has come to broadcast synthesized images including the display of date, time and characters, or synthesized images including movie subtitle, CG (computer graphics), video camera image, etc. inserted therein.

The original image data of each image portion forming such the synthesized image may be a 60 Hz broadcast data originally conforming to the NTSC system, a CG data generated by a 22 pull-down method, or an image data generated by a 23 pull-down method.

Namely, one synthesized image may include a video camera image imaged by the interlace method with a 60 Hz frame frequency, which is synthesized with a CG image generated by the progressive method with a 30 Hz frame frequency. Another synthesized image may include a progressive CM (commercial film) image of a frame frequency of 30 Hz, which is synthesized with a character telop generated by the interlace method of a 60 Hz frame frequency.

As such, a display screen image may have an interlace-scanned synthesized image generated through the synthesis and superposition with images of different frame frequencies, including date, time, character display, movie subtitle, CG (computer graphics) by the 22 pull-down method, and video camera image by the 23 pull-down method, which are window displayed at local positions.

When processing IP conversion of the interlaced image generated through the synthesis and superposition of the image having the different frame frequency, film mode detection is carried out on the synthesized image. Based on the detection result, the IP conversion is performed to convert to an image data of a sequential scanning method.

Here, the film mode signifies a mode of an image data being in a state that a film source such as movie is converted to obtain an interlaced image (a telecine processed state). Also, the film mode detection signifies the processing to detect the conversion method to a broadcast data in the above telecine processing, such as the 22 pull-down sequence and the 23 pull-down sequence, or neither thereof.

Now, the 22 pull-down image data and the 23 pull-down image data will be explained in brief.

FIG. 1A is a diagram schematically illustrating a data array of a 22 pull-down image data being converted from a 30 Hz progressive video signal, which is imaged by a digital video camera, to a 60 Hz interlaced video signal, as an example.

FIG. 1B is a diagram schematically illustrating a data array of a 23 pull-down image data, being converted from a 24 Hz film progressive video signal of a movie data to a 60 Hz interlaced video signal.

As shown in FIG. 1A, in the 22 pull-down sequence, two fields (f1*t*, f1*b*), (f2*t*, f2*b*) . . . of an interlaced video signal are generated from each one frame F1, F2 . . . of a progressive video signal, and such the conversion procedure is repeated.

Meanwhile, as shown in FIG. 1B, in the 23 pull-down sequence 3, three fields (f11, f12, f13) of an interlaced video signal are generated from a first frame F1 of a progressive video signal in a cinema image frame. Next, two fields (f21, f22) of the interlaced video signal are generated from a second frame F2. The above conversion procedures to obtain 3 fields and 2 fields are successively repeated for the progressive video signal frames in a frame F3 and thereafter.

Here, in the 23 pull-down sequence shown in FIG. 1B, the field (f13) generated in the third and the field (f33) generated in the eighth have identical data to the field data (f11) generated in the first and the field data generated in the sixth, respectively. Namely, the fields (f13), (f33) are repeated fields.

The above repeated fields (f13), (f33) are respectively inserted between the fields (f12) and (f21), and between the fields (f32) and (f41) which are mutually distant in the time axis. As a result, when looked as one screen, a "combing noise" phenomenon is produced in the image between the repeated portion and the non-repeated portion. Further, the combing noise phenomenon is also produced in the synthesis boundary portion of the synthesized image having different frequencies.

To obtain a 60 Hz high-quality progressive image through the IP conversion after correcting the above phenomenon by interpolation etc., it is necessary to confirm whether the interlaced video signal before the IP conversion is a synthesized image. For each synthesized image portion in case of a synthesized image, or for the entire image in case of a non-synthesized image, it is further necessary to confirm whether the above image portion, or the entire image, is a 22 pull-down image data or a 23 pull-down image data. For the above confirmation, the aforementioned film mode detection is performed.

As such, if only the conversion method in the original image is known, according to the conversion method concerned, it has been considered that a high quality image can be obtained by performing IP conversion on the basis of each synthesized image, using either the transform IP conversion or the motion-compensated IP conversion.

For the above purpose, a variety of techniques have been proposed as conventional techniques to perform the film mode detection.

As such the conventional techniques, FIGS. 2A and 2B are explanation diagrams illustrating first and second exemplary configurations of a typical synthesized image detection unit having the film mode detection function.

In the conventional configuration shown in FIG. 2A, there are provided two field memories 10, 11, a film mode detection function section 100, a transform IP converter 15, a motion-compensated IP converter 16, and a synthesizer 14.

In order to perform the film mode detection (22/23 pull-down sequence detection) using an interframe difference etc., field signals F(n), F(n−1) and F(n−2) for consecutive three fields are output, using the two field memories: first field memory 10 and second field memory 11.

The above field signals F(n), F(n−1) and F(n−2) for the three fields are input to a feature amount extractor 12 on a screen-by-screen basis, constituting film mode detection function section 100.

Meanwhile, the above field signals F(n), F(n−1) and F(n−2) for the consecutive three fields are also input to transform IP converter 15 and motion-compensated IP converter 16.

Feature amount extractor 12 inputs the above field signals F(n), F(n−1) and F(n−2) for the consecutive three fields. A feature amount of one screen is detected by the above screen feature amount extractor 12 constituting film mode detection function section 100.

A screen film mode detector 13 inputs the detected feature amount for each screen from feature amount extractor 12. Then, screen film mode detector 13 retains the screen feature amounts detected in feature amount extractor 12 over a plurality of fields in the past, and detects the film mode from the overall motion result.

Based on the film mode detection result, a signal after the IP conversion from either transform IP converter 15 or motion-compensated IP converter 16 is made effective.

The invention related to the conventional technique shown in FIG. 2A is disclosed in Patent document 1. In short, according to the invention described in Patent document 1, a feature for the overall image is extracted, and based on the overall motion result obtained from the above result, the film mode is decided.

Meanwhile, according to the conventional configuration shown in FIG. 2B, there are shown two field memories 10, 11 and a film mode detection function section 100 only, while transform IP converter 15, motion-compensated IP converter 16 and synthesizer 14 shown in FIG. 2A are omitted in the figure.

From the two field memories 10, 11, image signals for three fields, namely a present field, a field before one field, and a field before the two fields are successively input, and local areas in the screen are successively selected by a local area selector 14. The local areas here signify respective pixel areas when the screen is sectioned into a plurality, m×n, of block areas.

The signals in the local areas successively selected by local area selector 14 are input into feature amount extractor 15.

In feature amount extractor 15 for the local areas, the feature of the related local area is extracted, which is then forwarded to a feature amount distributor 16. Feature amount distributor 16 forwards the feature amount extracted in feature amount extractor 15 to the corresponding film mode detector in film mode detectors 17a-17n, each corresponding to each of the plurality of local areas. There, the detection whether or not the film mode is made for each local area. As a conventional technique related to such the conventional technique as shown in FIG. 2B, there is an invention disclosed in Patent document 2. According to the invention of Patent document 2, the screen area is divided in advance into a plurality of local areas having no relation with the synthesized image area, and the film mode detection is carried out for each divided area.

Furthermore, there is an invention described in Patent document 3. According to the invention, a field image is divided into a plurality of blocks, as shown in FIG. 2B. Then, in regard to each divided block, a motion vector having the highest reliability between two consecutive field images having an identical property (odd or even field) is detected, so as to perform motion compensation. At the time of the motion vector detection, using the detected motion vector and the reliability information, a repeated field image included in the video signal is detected, and the film mode is decided accordingly.

[Patent document 1] Japanese Unexamined Patent Publication No. 2005-318624.

[Patent document 2] Japanese Unexamined Patent Publication No. 2005-318611.

[Patent document 3] Japanese Unexamined Patent Publication No. 2006-303910.

Here, by the decision of the film mode for each screen according to the invention described in Patent document 1, it is possible to detect the film mode from an image edited for each screen. However, in case of a synthesized image, for example, when a CG area and a CM film area are relatively large, or when the feature thereof is intense, detection of a 30 Hz film image is made, and the IP conversion for film is performed.

As a result, there arises the problem of the occurrence of a combing noise, in which a dithered image like a residual image is produced in a 60 Hz video camera image and a character telop, causing an image deviating line-by-line in a comb shape.

Also, by the film mode decision on the basis of each local area according to the inventions described in the aforementioned Patent document 2 and Patent document 3, because of deciding the film mode for each local area, it is possible to obtain the film mode detection optimal to each local area, and IP conversion.

However, it is necessary to provide a plurality of film mode detection function sections corresponding to respective local areas, and accordingly, there is the problem that the circuit scale becomes relatively large.

SUMMARY

Accordingly, the objective of the present invention is to provide a synthesized image detection unit which can solve the problems in the conventional techniques according to the inventions described in Patent documents 1 and 2.

To achieve the above-described object, according to the present invention, a synthesized image detection unit includes: a means for extracting a feature amount of a screen produced by an input interlace-scanned video signal; and a film mode detection means for detecting a film mode on a screen-by-screen basis from the feature amount extracted by the means for extracting the feature amount of the screen.

Further, the detection to be a film mode is inhibited when a feature amount (likelihood of an interlaced image) not being a film mode is detected from the local area data.

The decision to be a synthesized image is made by deciding the presence or absence of motion through a threshold decision of an interframe difference, and in case that the motion is present, with regard to consecutive three fields $F(n)$, $F(n-1)$ and $F(n-2)$, obtaining a first sum of absolute interfield differences by adding the absolute differences between the fields $F(n)$ and $F(n-1)$ for a line-by-line local area, and a second sum of absolute interfield differences by adding the absolute differences between the fields $F(n-1)$ and $F(n-2)$ for the line-by-line local area.

Thereafter, when a high correlation exists between the first sum of the absolute interfield differences and the second sum of the absolute interfield differences, the decision to be a synthesized image is made. As the case of a high correlation is that, by obtaining a quotient between the first sum of the absolute interfield differences and the second sum of the absolute interfield differences, the obtained quotient is close to 1.

As such, according to the present application of the invention, irrespective of the film mode detection result based on the screen feature amount in the film mode detection, the decision to be a synthesized image is made using the detection result of a local area having likelihood of interlace for each local area (the existence of a local area of non-film mode) through the local area feature amount extraction, so as to release the above-mentioned film mode.

Thus, it is possible to obtain high quality by reducing the occurrence of a combing noise to a synthesized image having an inserted image of a different frame frequency.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 2A is an explanation diagrams illustrating first exemplary configuration of a typical synthesized image detection unit having the film mode detection function;

FIG. 6 is a diagram plotting values of SAD1 and SAD2 and quotient values of SAD1 by SAD2.

DESCRIPTION OF EMBODIMENT(S)

Embodiments will now be described with reference to the drawings.

Figure 3:
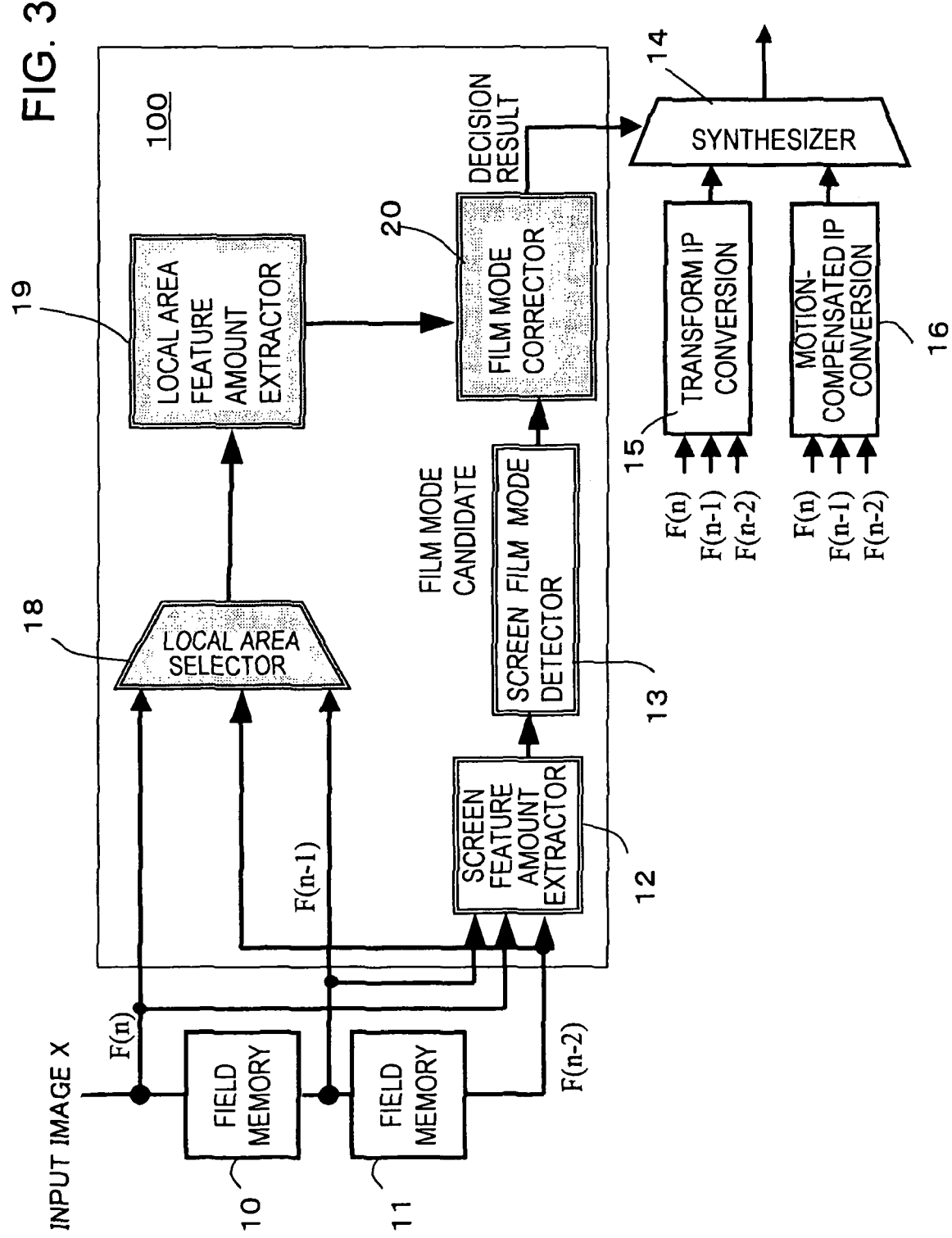
FIG. 3 is an exemplary configuration block diagram of a synthesized image detection unit according to the present invention.

FIG. 3 is an exemplary configuration block diagram of a synthesized image detection unit in an embodiment.

As to the functions represented in the exemplary block diagram, it is also possible to configure by firmware or by program execution in CPUs each functioning as a functional means corresponding to each block, in addition to a case of configuring by hardware.

As shown in the figure, the synthesized image detection unit includes two field memories 10, 11, a film mode detection function section 100, a transform IP converter 15, a motion-compensated IP converter 16, and a synthesizer 14.

To perform the film mode detection (22/23 pull-down sequence detection) by an interframe difference etc., field signals $F(n)$, $F(n-1)$ and $F(n-2)$ for consecutive three fields are output using two field memories: a first field memory 10 and a second field memory 11.

The above field signals $F(n)$, $F(n-1)$ and $F(n-2)$ for three fields are input to film mode detection function section 100.

Meanwhile, the above field signals $F(n)$, $F(n-1)$ and $F(n-2)$ for the consecutive three fields are also input to transform IP converter 15 and motion-compensated IP converter 16 through other wirings.

Figure 1A:
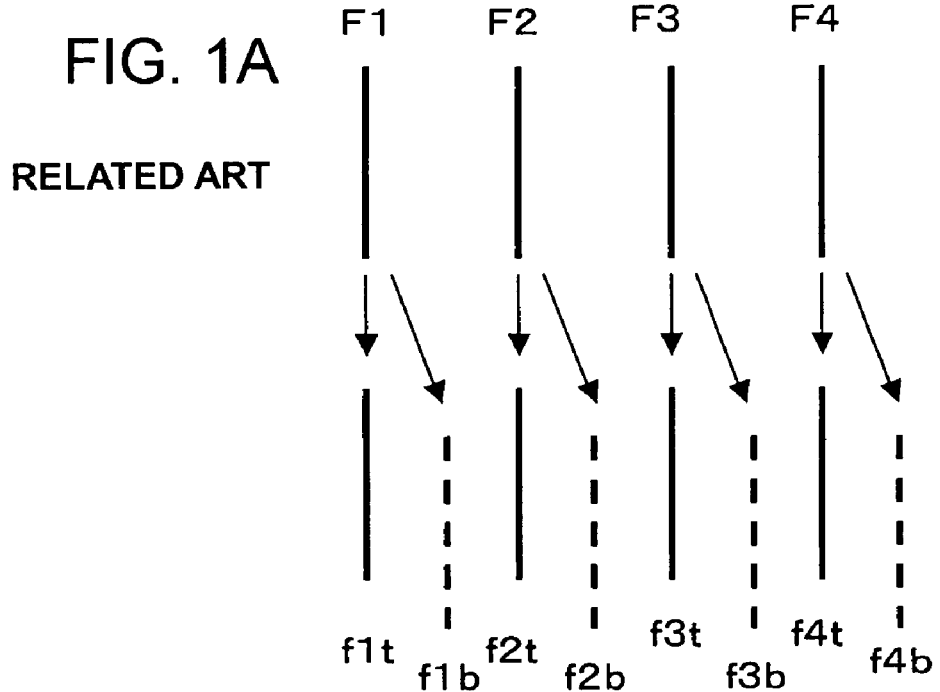
FIG. 1A is a diagram schematically illustrating a data array of a 22 pull-down image data being converted from a 30 Hz progressive video signal, which is imaged by a digital video camera, to a 60 Hz interlaced video signal, as an example.
Figure 1B:
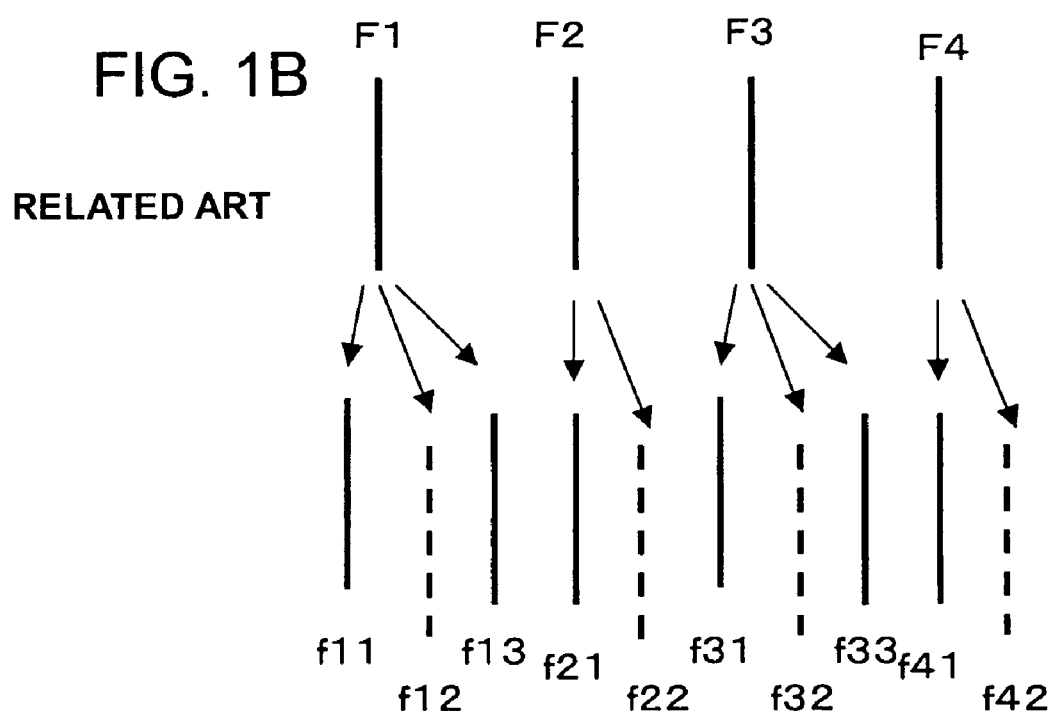
FIG. 1B is a diagram schematically illustrating a data array of a 23 pull-down image data, being converted from a 24 Hz film progressive video signal of a movie data to a 60 Hz interlaced video signal.
Figure 2B:
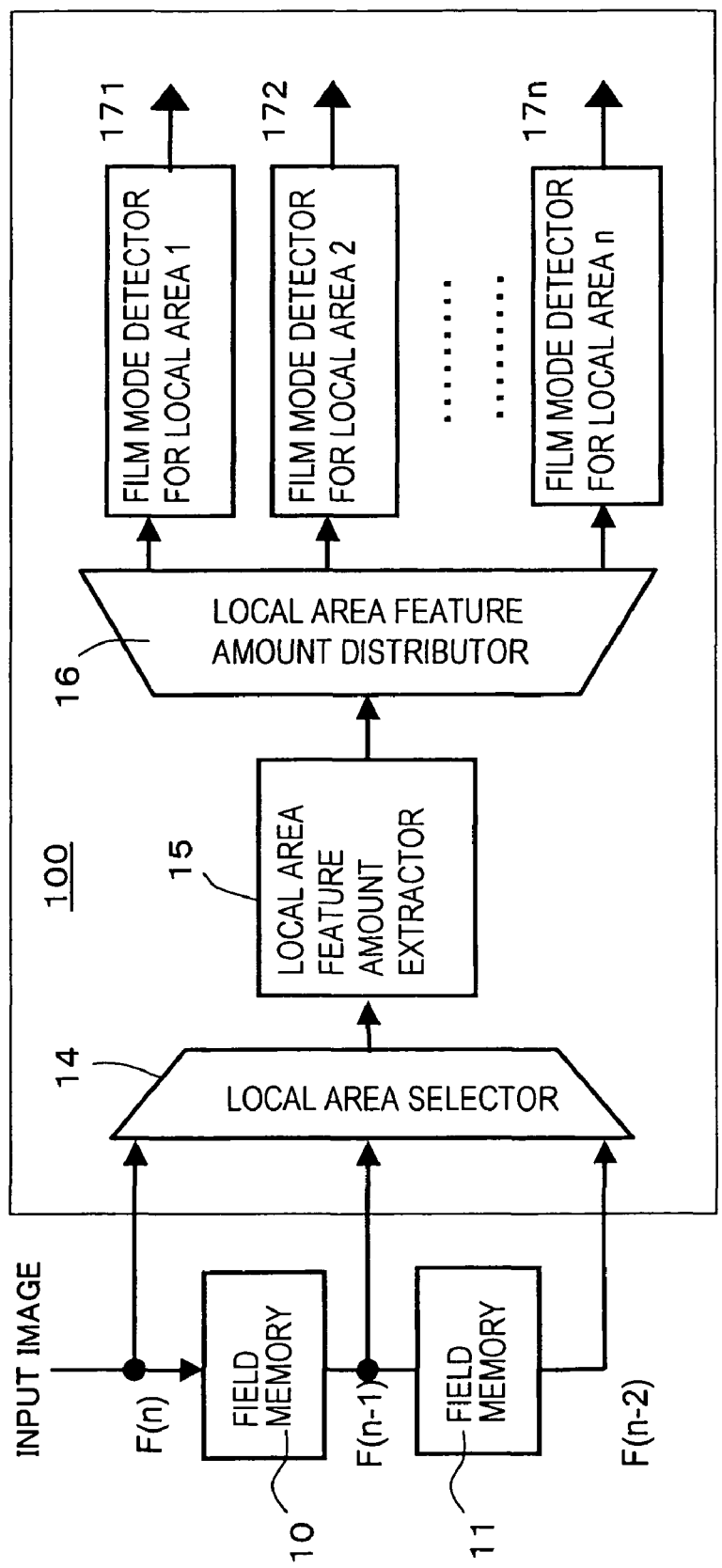
FIG. 2B is an explanation diagrams illustrating second exemplary configuration of a typical synthesized image detection unit having the film mode detection function.

As an embodiment, film mode detection function section 100 includes a screen feature amount extractor 12 and a screen film mode detector 13, similar to the configuration shown in FIG. 2A.

Screen feature amount extractor 12 inputs the above field signals $F(n)$, $F(n-1)$ and $F(n-2)$ for the consecutive three fields, and detects a feature amount on a screen-by-screen basis.

A screen film mode detector 13 inputs the detected feature amount on a screen-by-screen basis, from screen feature amount extractor 12. Each screen feature amount detected in screen feature amount extractor 12 is retained over a plurality of fields in the past, and detects the film mode from the overall motion result.

Screen feature amount extractor 12 decides the degree of similarity of the images among the images in both the present field and the adjacent fields having been delayed by field memories 10, 11. The above decided degree of similarity is forwarded to film mode detector 13, as a screen feature amount.

Based on the degree of similarity among the adjacent field images input by film mode detector 13, it is decided whether or not the input video signal is a video signal converted into an interlace television image, i.e. a film mode signal.

When it is decided to be film mode, in the conventional configuration, synthesizer 14 switches and outputs so as to make the output of motion-compensated IP converter 16 effective.

In contrast, in the embodiment, there are provided in film mode detection function section 100 a local area selector 18, a local area feature amount extractor 19 for extracting the likelihood of interlace in the local area, and a film mode corrector 20. Here, in the embodiment of the present invention shown in FIG. 3, the signification of local area in local area feature amount extractor 19 is on a line-by-line basis.

Figure 4:
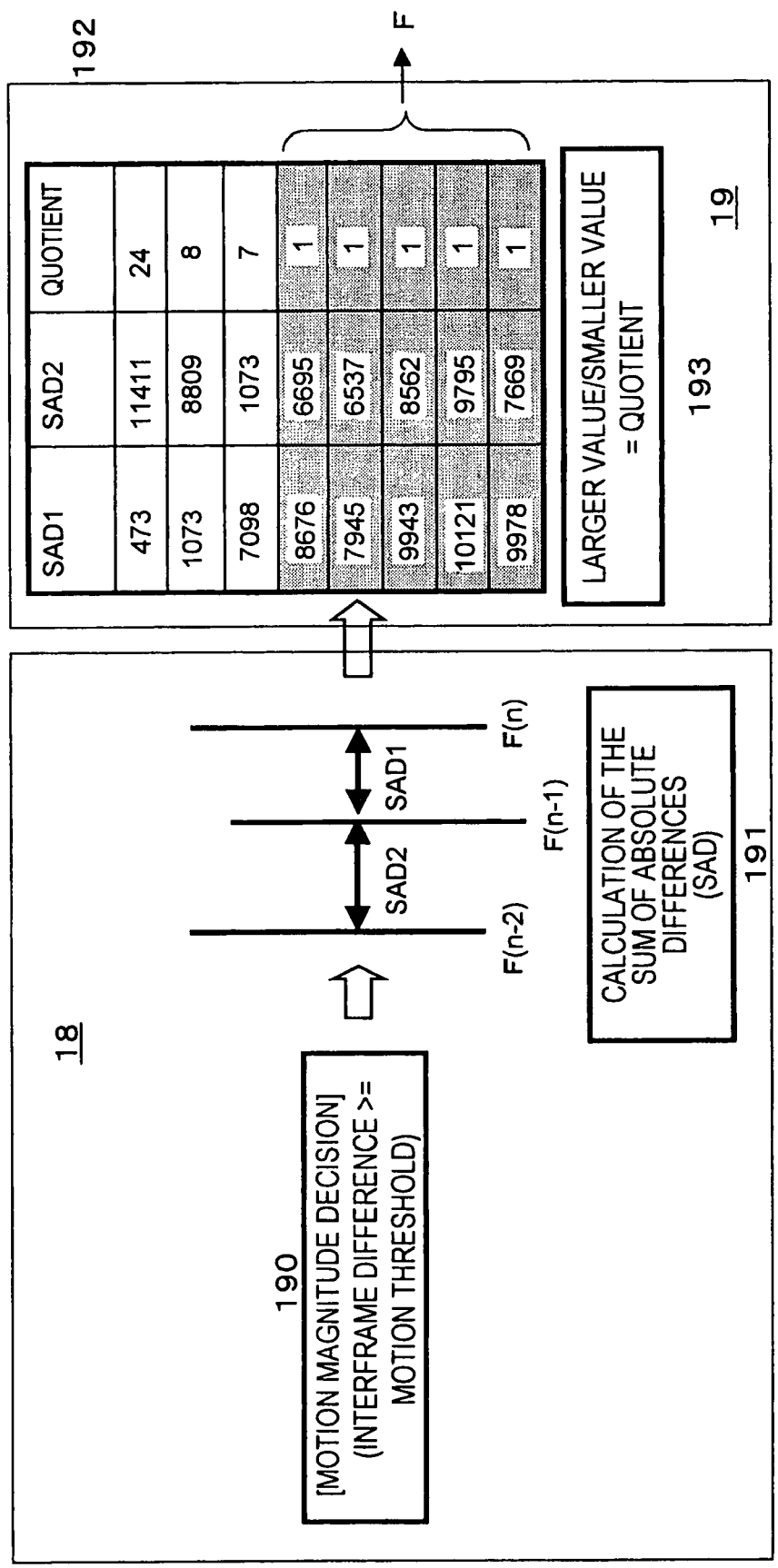
FIG. 4 is a diagram illustrating processing function sections executed by local area selector 18 and local area feature amount extractor 19 for extracting the likelihood of interlace in the local area.

FIG. 4 is a diagram illustrating processing function sections executed by local area selector 18 and local area feature amount extractor 19 for extracting the likelihood of interlace in the local area.

More specifically, in FIG. 4, a motion magnitude decider 190 in local area selector 18 inputs the field signals for three fields, i.e. F(n), F(n−1) and F(n−2), and decides the motion magnitude by detecting whether each interframe difference in a line-by-line local area exceeds a threshold. Namely, it is decided whether or not a motion pixel is present in a line-by-line local area concerned.

When it is decided the motion pixel is present, a calculation function section 191 for calculating the sum of absolute differences obtains the sum of absolute differences (SAD) in the above-mentioned three fields.

Namely, an absolute value of difference between the corresponding pixels on a line between the field signal F(n) and the field signal F(n−1) is obtained, and then the accumulated value for the line concerned is obtained. The above accumulated value is defined to be a first sum of absolute interfield differences SAD1. Similarly, an absolute value of difference between the corresponding pixels on a line between the field signal F(n−1) and the field signal F(n−2) is obtained, and then the accumulated value for the line concerned is obtained. The accumulated value is defined to be a second sum of absolute interfield differences SAD2.

SAD1 and SAD2 thus obtained for each local area (line-by-line) are forwarded to local area feature amount extractor 19.

Local area feature amount extractor 19 obtains the correlation between the above SAD1 and SAD2, and decides to be a synthesized image when the obtained correlation is high.

As an embodiment, local area feature amount extractor 19 has a table (192) in which SAD1 and SAD2 are correspondingly stored for each local area (line-by-line). Next, a division function section 193 decides the magnitude of SAD1 and SAD2 values, and then divides a larger value by a smaller value. The quotient obtained above is registered in table 192.

Next, when the obtained quotient is "1", the local area (line-by-line) becomes a synthesized image candidate, and a synthesized image candidate flag F is made effective.

Here, when the quotient obtained from the division between SAD1 and SAD2 is "1", the reason why it is possible to decide to be a synthesis candidate will be explained using FIGS. 5A, 5B and FIG. 6.

Figure 5A:
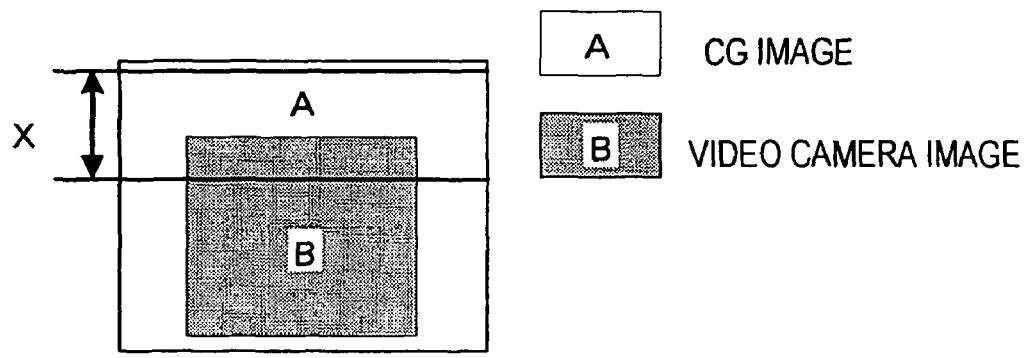
FIG. 5A is a diagram illustrating an image screen in which a CG image A and a video camera image B are synthesized in an interlace scanning screen.

As an example, FIG. 5A is a diagram illustrating an image screen in which a CG image A and a video camera image B are synthesized in an interlace scanning screen. In FIG. 5A, consider an area X in which the boundary between the CG image (22 pull-down image) A and the video camera image (60 Hz interlaced image) B exists.

Figure 5B:
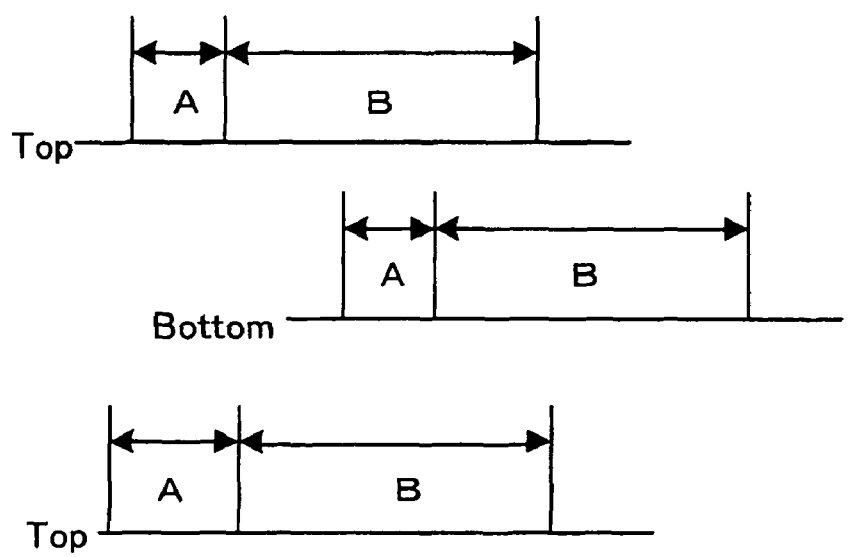
FIG. 5B is a diagram illustrating a state where the signal of the CG image (22 pull-down image) A and the signal of the video camera image (60 Hz interlaced image) B are switched over in the scanning direction.

In such the case, in the interlace scanning screen, the signal of the CG image (22 pull-down image) A and the signal of the video camera image (60 Hz interlaced image) B are switched over in the scanning direction, as shown in FIG. 5B.

FIG. 6 is a diagram plotting the values of the aforementioned SAD1 and SAD2 and the quotient values of SAD1 by SAD2, in a partial area including a portion in which the signal of the CG image (22 pull-down image) A and the signal of the video camera image (60 Hz interlaced image) B are switched over in one scanning direction shown in FIG. 5B. In FIG. 6, the horizontal axis represents the number of pixels in the scanning direction, and the vertical axis represents the SAD value.

In the above FIG. 6, the interlaced video camera image B having motion has a tendency that SAD1 and SAD2 have similar values, and as a result of division, "1" is calculated.

In contrast, in the CG film image A, since the original image is a progressive image and two fields out of three are obtained, the value tends to be extremely small in a certain SAD, while the value tends to be large in the other SAD. In such the case, the quotient of SAD1 by SAD2 becomes large.

Additionally, in the above description, a case that the quotient of SAD1 by SAD2 is "1" includes a case of the quotient close to "1". Namely, in FIG. 4, the quotients are rounded off to integers. Referring to FIG. 7, the above reason can be explained as follows.

Figures 7A, 7B, 7C:
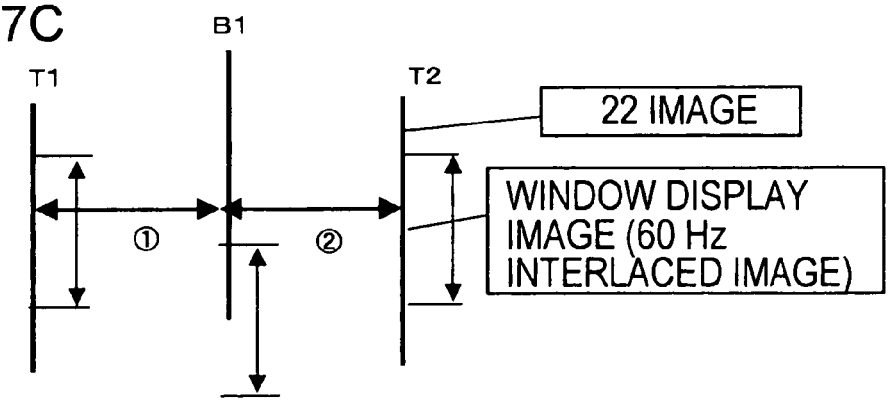
FIG. 7 is an explanation diagram illustrating quotient distribution of SAD1 by SAD2 in regard to a 22 pull-down sequence image.

Namely, FIG. 7A illustrates quotient distribution of SAD1 by SAD2 in regard to a 22 pull-down sequence image. Also, FIG. 7B illustrates quotient distribution of SAD1 by SAD2, in regard to a synthesized image (synthesis of a 22 pull-down sequence image with a 60 Hz interlaced image).

Further, as shown in FIG. 7C, because the input of the film image (22/23 pull-down sequence image) is the progressive image (24P, 30P), the values of SAD1 of T2 (image at present) and B1 (image of one field before) and the values of SAD2 of T1 (image of two fields before) and B1 (image of one field before) have relationship of largeness to smallness or smallness to largeness whatever the motion may be, and the actual quotient values become 2 or greater.

To the contrary, in case of a 60 Hz interlaced image, pixel differences tend to disperse field-by-field. In the time axis direction, the larger the motion is, the greater the values of SAD1 and SAD2 disperse, causing that the actually obtained quotients comes to approximate "1". Therefore, when rounding off the quotient accuracy by ½, in the 22/23 pull-down sequence, without causing incorrect detection, it can be said that a 60 Hz interlaced image likely to be interlace is existent because of continuous quotient values of "1" in the pixel direction.

Thus, by making as a decision value the quotient value of SAD1 by SAD2 to be "1", it is possible to distinguish images of different frame frequencies.

However, even the decision of motion magnitude for each local area (line-by-line) indicates the presence of motion, when the motion is small, the difference between SAD1 and SAD2 becomes large. As a result, there may be cases that the calculation result of the quotient value ranges between 2 and 10.

Referring back to FIG. 3, when the quotient of SAD1 by SAD2 is "1", local area feature amount extractor 19 decides to be a video camera image, sets the flag F, and inputs to a film mode corrector 20.

In the above case, when the local areas (line-by-line) having continuous flag F is, for example, 4 lines or more, even when the detection result of film mode detector 13 is a film mode candidate, film mode corrector 20 gives preference to the detection result of local area feature amount extractor 19 of the local area (line-by-line). Thus, the decision to be a synthesized image is made, and the film mode is released. With this, synthesizer 14 outputs by switching to the output of the motion-compensated IP conversion.

In the conventional film mode detection using the configuration described earlier, combing noise is produced because the film mode is detected to a synthesized image and film (transform) IP conversion is performed.

In contrast, according to the embodiment, using the detection result (that a local area of non-film mode exists) for each local area in regard to the likelihood of interlace in the local area, local area feature amount extractor 19 decides to be a synthesized image, irrespective of the film mode detection result of the screen film mode detector based on a screen feature amount. Thus, the film mode is released.

With this, it is possible to reduce the occurrence of the combing noise in the synthesized image having an inserted image of different frame frequency, and thereby high quality can be achieved. Accordingly, the present invention can largely contribute to the industry.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A synthesized image detection unit comprising:
   an extracting unit to extract a feature amount of a screen produced by an input interlace-scanned video signal;
   a film mode detection unit to detect a film mode on a screen-by-screen basis from the feature amount extracted by the extracting unit;
   a decision unit to decide the input interlace-scanned video signal to be a synthesized image from a local area in the screen; and
   a film mode correction unit to control the film mode detection unit not to output the film mode detection result, based on the decision result by the decision unit.

2. The synthesized image detection unit according to claim 1, wherein the decision unit
   decides the presence or absence of motion by a threshold decision of an interframe difference,
   in case that the motion is present, with regard to consecutive three fields $F(n)$, $F(n-1)$ and $F(n-2)$, obtains a first sum of absolute interfield differences by adding the absolute differences between the fields $F(n)$ and $F(n-1)$ for a line-by-line local area, and a second sum of absolute interfield differences by adding the absolute differences between the fields $F(n-1)$ and $F(n-2)$ for the local area, and
   decides the input interlace-scanned video signal to be a synthesized image when a correlation exists between the first sum of the absolute interfield differences and the second sum of the absolute interfield differences.

3. The synthesized image detection unit according to claim 2, wherein, when deciding to be the synthesized image, the decision unit obtains a quotient between the first sum of absolute interfield differences and the second sum of absolute interfield differences, and decides that the correlation exists when the quotient is close to 1.

4. The synthesized image detection unit according to claim 3, wherein the film mode detecting unit detects the film mode by detecting a 22 pull-down sequence or a 23 pull-down sequence.

5. The synthesized image detection unit according to claim 2, wherein the film mode detecting unit detects the film mode by detecting a 22 pull-down sequence or a 23 pull-down sequence.

6. The synthesized image detection unit according to claim 1, wherein the film mode detecting unit detects the film mode by detecting a 22 pull-down sequence or a 23 pull-down sequence.

7. A synthesized image detection unit comprising:
   a screen feature amount extracting unit to extract a feature amount of a screen produced by an input interlace-scanned video signal;
   a film mode detecting unit to detect a film mode on a screen-by-screen basis from the feature amount extracted by the screen feature amount extracting unit;
   a local area selecting unit to select a local area in the input interlace-scanned video signal;
   a synthesized image decision unit to decide the input interlace-scanned video signal to be a synthesized image local area feature amount extracting unit to extract, based on the local area selected by the local area selecting unit; and
   a film mode correction unit to control the film mode detecting unit not to output the detected film mode as a decision result, based on the decision result of the synthesized image decision unit.

8. The synthesized image detection unit according to claim 7, wherein the film mode detecting unit detects the film mode by detecting a 22 pull-down sequence or a 23 pull-down sequence.

9. A non-transitory storage medium storing a program which is readable by a synthesized image detection unit which performs IP (Interlace to Progressive) conversion optimal for displaying an interlace-scanned video signal successively on a scanning display, when the program is executed, the synthesized image detection unit being configured to perform:
   extracting a feature amount of a screen produced by an input interlace-scanned video signal;
   detecting a film mode on a screen-by-screen basis from the feature amount extracted;
   deciding the input interlace-scanned video signal to be a synthesized image from a local area in the screen; and
   controlling in the film mode detection, not to output the film mode detection result, based on the decision result.

10. The non-transitory storage medium according to claim 9, wherein the film mode is detected by detecting a 22 pull-down sequence or a 23 pull-down sequence.

* * * * *